United States Patent
Abe

[11] Patent Number: 6,088,400
[45] Date of Patent: Jul. 11, 2000

[54] RECEIVING DEVICE FOR SYNCHRONOUS SERIAL TRANSMISSION DATA

[75] Inventor: Shinichi Abe, Tokyo, Japan

[73] Assignee: Oki Electric Industry Co., Ltd., Tokyo, Japan

[21] Appl. No.: 08/879,307

[22] Filed: Jun. 19, 1997

[30] Foreign Application Priority Data

Oct. 8, 1996 [JP] Japan ................................. 8-267079

[51] Int. Cl.$^7$ ............................................ H04L 27/06
[52] U.S. Cl. ........................................ 375/316; 375/340
[58] Field of Search ................................... 375/259, 340, 375/316; 377/28

[56] References Cited

U.S. PATENT DOCUMENTS 4,045,771  8/1977  Loreck ........................... 340/146.1
4,864,303  9/1989  Ofek .................................. 341/95

FOREIGN PATENT DOCUMENTS 61-295735  12/1986  Japan.
62-15598    1/1987  Japan.
62-73826    4/1987  Japan.

Primary Examiner—Tesfaldet Bocure
Attorney, Agent, or Firm—Rabin & Champagne, P.C.

[57] ABSTRACT

A receiving device for synchronous serial transmission data includes a transmission path for transmitting data synchronized to clock signal according to a bit serial system; a shift register for holding the data transmitted in series; and an operating device executing an operation on a bit-by-bit basis between first data provided by the shift register and second data received at the shift register. The operating device performs the operation between the first data and the second data on a bit-by-bit basis at the same time that the second data are received, without requiring a save register having the capacity to store the entire data size.

6 Claims, 3 Drawing Sheets

F I G. 1
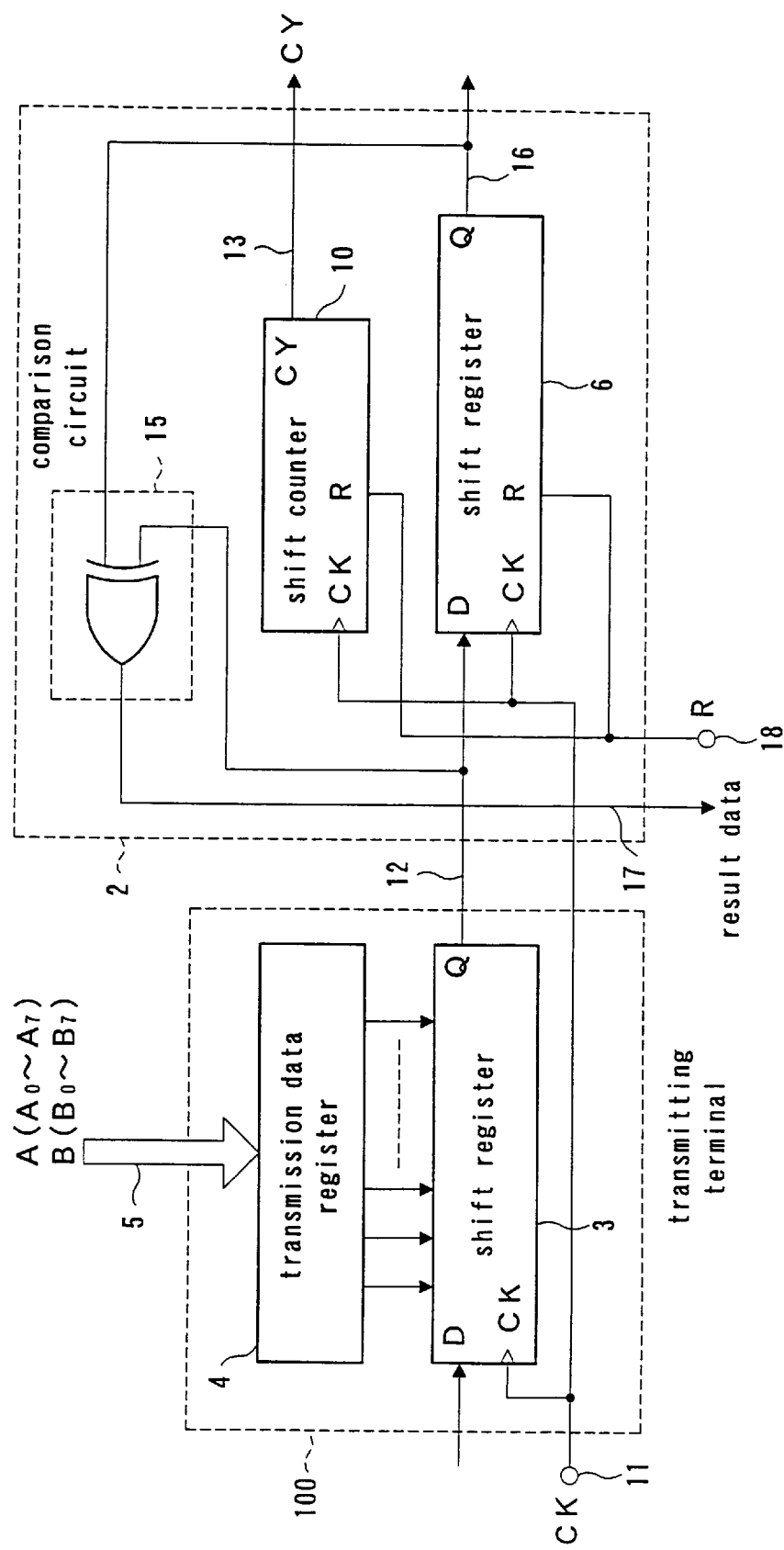

RECEIVING DEVICE FOR SYNCHRONOUS SERIAL TRANSMISSION DATA

BACKGROUND OF THE INVENTION

The invention relates to a receiving device for synchronous serial transmission data that are serially transmitted in synchronization with a clock signal.

FIG. 3 is a block diagram illustrating an example of a prior art data transmitting/receiving circuit for use in synchronous serial communication. In the figure, a reference numeral 100 generally represents a device on the transmitting end while a reference numeral 200 generally indicates a device on the receiving end.

The device on the transmitting end 100 includes a shift register 3, which temporarily holds a plurality of bit data prior to transmission, and a transmission data register 4 which transfers the transmission data in parallel to the shift register 3. This shift register 3 is connected in parallel with the transmission data register 4 in such a manner that corresponding bits of both registers are connected with each other. The transmission data register 4 is also connected to a bus line 5.

The device on the receiving end 200 includes a shift register 6 for receive data, a latch circuit 7 which latches the data after receiving it, a save register 8 for temporarily saving the data therein, an operational circuit 9, and a shift counter 10 for notifying the timing of the completion of data transfer.

A reference numeral 11 indicates a trigger input terminal, at which a clock signal CK for synchronous data transfer use is supplied to the shift register 3, the shift register 6, and the shift counter 10, respectively, as a synchronous clock signal. The shift-out terminal (Q) of the shift register 3 is connected to the shift-in terminal (D) of the shift register 6 in the device at the receiving end 200 via a serial transmission line 12.

Next, the operation of the data transmitting/receiving circuit as arranged above will be describe in the following.

As 8-bit transmission data A (A0~A7) are received on the bus line 5 of the device at the transmitting end 100, the data to be transmitted are temporarily stored in the transmission data register 4. Then, the data A are transferred in parallel to the shift register 3 and are held therein. These data as held in the shift register 3 are transmitted over the serial transmission line 12 on a bit-by-bit basis at every cycle of the clock signal CK received at the trigger input terminal 11, and then are transferred to the shift register 6 in the device at the receiving end 200. On one hand, while this operation is executed, the shift counter 10 counts the number of clock signals CK that have been received, in order to detect the time period that indicates the end of the data transfer. Detecting this time period, the shift counter 10 transmits a signal indicative of the end of the data transfer to the system over a transmission line 13.

At the time that the data transfer is completed, the data A (A0~A7), which had been transferred to the shift register 6, are latched in the latch circuit 7. After this, the first transferred data A are stored in the save register 8 as operand data.

Likewise, in the device at the receiving end 200, more data B (B0~B7) are received as operation data by the shift register 6 and are also latched by the latch circuit 7.

Finally, the operand data A (A0~A7) stored in the save register 8 in advance and the operation data B (B0~B7) later received and latched by the latch circuit 7, are provided to the operational circuit 9, which performs an intended operation. The result of this operation is provided to the system over a bus line 14.

However, in order to execute the operation with regard to the receive data A and B in the device at the receiving end 200 as arranged above, it is necessary to select the save register 8 and the operational circuit 9 such that they have bits that can correspond to all the bits of the shift register 6. Consequently, the device at the receiving end 200 must have a complex circuit arrangement. Furthermore, it is not possible to initiate the operation with regard to the operation data B (B0~B7) and the operand data A (A0~A7) until all the bits of the data B are completely transferred to the catch circuit 7. This means, therefore, that the receiving device as arranged above has a deficiency in that an unavoidable time lag exists, equivalent to the period of time from the start of data transfer to acquisition of the final operation result.

SUMMARY OF THE INVENTION

Accordingly, it is an object of the invention to provide a novel and improved receiving device for synchronous serial transmission data, wherein the scale of related circuit can be downsized by eliminating some circuit elements such as a save register, and the operation can be made more efficient.

Furthermore, it is another object of the invention to provide a novel and improved receiving device for synchronous serial transmission data, wherein the operation can be executed almost at the same time as the transfer operation of the latter data (i.e. data B) starts, thus enabling the time lag between the start of data transfer and acquisition of the final operation result to be largely reduced.

In order to achieve the above objects, the invention provides a receiving device for synchronous serial transmission data, which includes a shift register for holding the data that are transmitted in series to be synchronized with clock signals according to the bit serial system, and an operational device which executes the operation on a bit-by-bit basis with regard to the first data provided by the shift register and the second data received by the shift register.

Other features of the invention within the scope of the claims appended hereto will be made more clear from the following description as well as from the accompanying drawings.

BRIEF DESCRIPTION OF THE DRAWINGS

FIG. 1 is a block diagram showing a receiving device according to the first embodiment of the invention;

DETAILED DESCRIPTION OF PREFERRED EMBODIMENTS OF THE INVENTION

The receiving device for synchronous serial transmission data will now be described in detail by way of preferred embodiments according to the invention, with reference to the accompanying drawings.

(First Embodiment)

Referring now to FIG. 1, the first embodiment of the invention as shown here is arranged for the purpose of carrying out a comparison operation with regard to the data A and B to determine whether or not identity exists therebetween.

Figure 3:
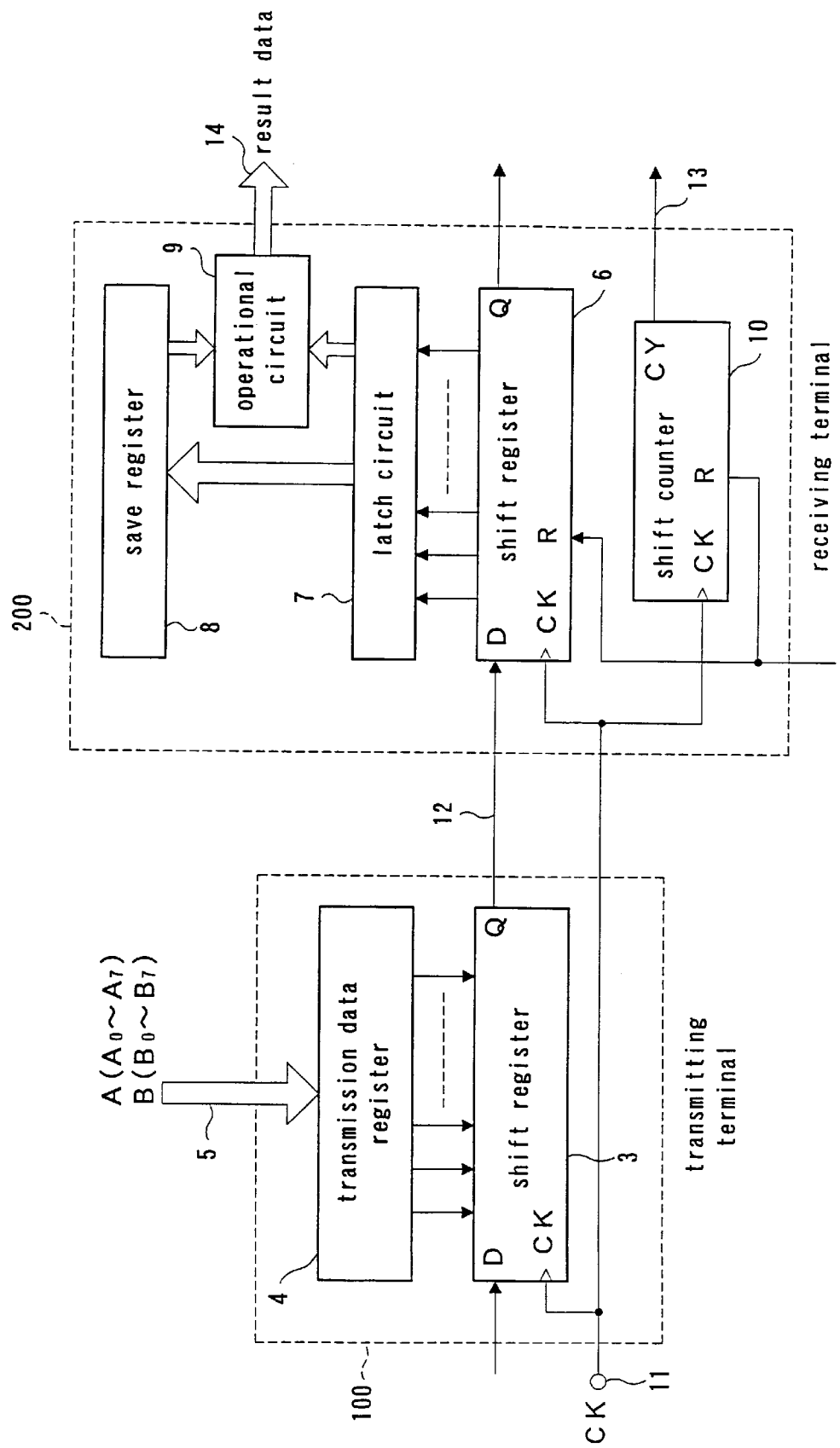
FIG. 3 is a block diagram showing an example of the prior art data transmitting/receiving circuit for use in synchronous serial communication.

In the figure, a receiving device 2 corresponds to the device at the receiving end 200 shown in FIG. 3. The device at the transmitting end 100 has the same arrangement as that of the prior art device. The constituents having substantially the same arrangement and function as those of the prior art device are indicated with like reference numerals.

A device at the transmitting end 100, which is substantially identical to that illustrated in FIG. 3, includes a shift register 3, which serves to temporarily hold a plurality of bit data and then to transmit the data, and a register for transmission data 4, which serves to transfer in parallel the transmission data to the shift register 3. This shift register 3 is connected in parallel with the transmission data register 4 in such a manner that corresponding bits of both registers are connected with each other. The data register 4 is also connected to a bus line 5.

The receiving device 2 according to the embodiment is provided with a comparison circuit 15, which is formed by an exclusive "OR" gate (EX-OR) as an operation circuit. The shift-in terminal (D) of a register 6 for receiving use in the receiving device 2 is connected with the shift-out terminal (Q) of the shift register 3 in the device at the transmitting end 100 via a serial transmission line 12. One input terminal of the comparison circuit 15 is connected to the serial transmission line 12 while the other input terminal of the comparison circuit 15 is connected to the shift-out terminal (Q) of the shift register 6 via a line 16.

A shift counter 10 serves to produce carry signals CY from its carry-out terminal (CY). Carry signals CY are notified to the external system of the receiving device 2 over a line 13.

A clock signal CK for synchronous data transfer use is applied to a trigger input terminal 11 and is then delivered therefrom, as a synchronous clock signal, to the shift register 3, the shift register 6, and the shift counter 10.

A flag indicative of the result of comparison operation by the comparison circuit 5 is provided to the external system on a line 17.

A reference numeral 18 indicates an input terminal for a reset signal R, which is further connected with each of reset terminals (R) of the shift register 6 and the shift counter 10 of the receiving device 2. The clock signal CK for synchronous data transfer supplied at the trigger input terminal 11, are supplied to the shift register 6 and the shift counter 10 as well.

Next, the operation of the receiving device 2 as arranged above will be described in the following.

The data A are sequentially transferred to the shift register 6 on the serial transmission line 12, starting with the lowest-order bit A0 and synchronized with the clock signal CK, and are shifted into sequence in the shift register 6. Then, the data already received in advance are simultaneously and sequentially shifted onto the line 16 from the shift-out terminal (Q) of the shift register 6.

When a series transfer of the data A is complete, the shift counter 10, which has counted cycles of the clock signal CK, produces the carry signal CY, which notifies the system, over the line 13, that the first round of data transfer is completed. The comparison circuit 15 will then execute a comparison operation for checking whether the data A is identical to the data B which are to be transferred in the second round of data transfer.

The comparison operation of the data A and B by the comparison circuit 15 starts from the lowest-order bits thereof and compares in sequence the corresponding equal-order bits with each other on a bit-by-bit basis. To be more concrete, as the transfer of data B in the second round of data transfer begins into the shift-in terminal (D) of the shift register 6, the data A that was already transferred in the first round of data transfer are shifted out of the shift-out terminal (Q) of the shift register 6 to the line 16, sequentially from the lowest-order bit thereof. Then, both of the data A as shifted out and the data B as transferred on the serial transmission line 12 are transferred to the comparison circuit 15, by which the corresponding equal-order bit data are compared with each other. In this comparison procedure, if it is determined that bits A0 and B0 are not identical to each other for instance, the comparison circuit 15 transmits a non-identity signal as its flag to the system on the line 17. If the data are identical to each other, the non-identity signal is not issued.

This comparison operation is continued until the non-identity signal is notified to the system, or until the transfer of the data B is completed. Unless the system receives a non-identity signal before the transfer of the data B is completed, it may be considered that the data A and B are identical to each other with regard to all the bits thereof.

In the above-mentioned receiving device 2 according to the first embodiment of the invention, the comparison operation can be initiated substantially at the same time as the data B are received bit-by-bit, and the non-identity signal can be provided to the system even while the data transfer is still taking place. Accordingly, with use of this receiving device, it becomes possible to efficiently perform error detection in the course of data transfer, or the data retransmission request to the system.

Furthermore, when the prior art device performs the comparison operation, the device requires a save register which has a capacity large enough to store the full size of the received data, but such is no longer needed in the invention. Still further, it is no longer necessary for a comparison circuit to have a capacity corresponding to the bit length of the receive data, thus enabling the scale of the comparison circuit to be remarkably reduced.

(Second Embodiment)

Figure 2:
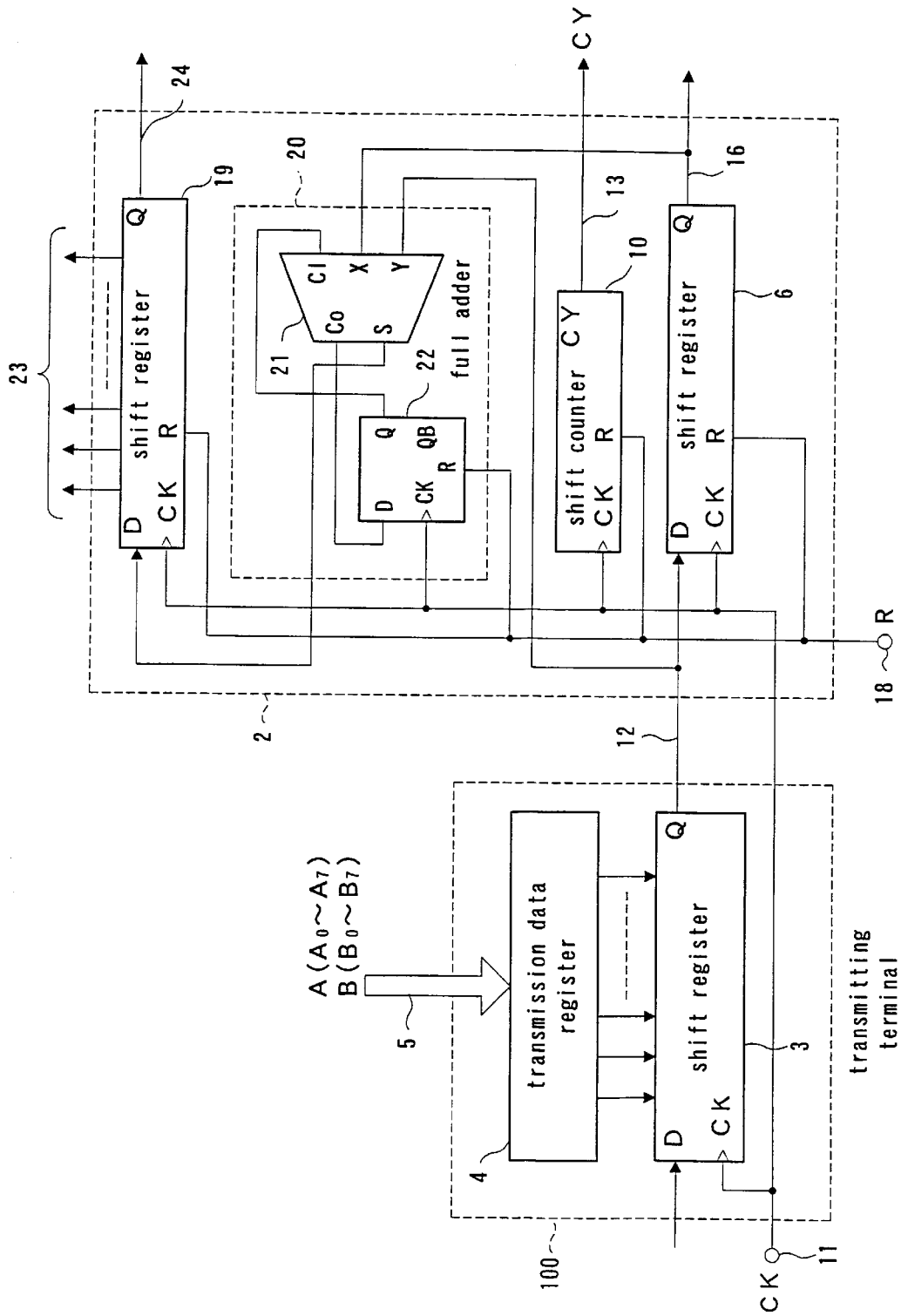
FIG. 2 is a block diagram showing a receiving device according to the second embodiment of the invention.

Referring now to FIG. 2, the second embodiment of the invention is arranged to perform an addition operation on the data A and B.

The receiving device 2 for synchronous serial transmission data is newly provided with a shift register 19 for holding an operation result, and an adding circuit 20, in addition to the shift register 6 and the shift counter 10 which are the same as the ones employed in the first embodiment. In the figure, parts corresponding to those of the prior art device are indicated with like reference numerals.

The adding circuit 20 is formed of a full adder 21 and a flip-flop circuit 22 used as a carry save.

The full adder 21 is provided with operation input terminals (X) and (Y), a carry input terminal Ci for carrying from a lower-order operation, an output terminal S of the operation result, and a carry output terminal Co for carrying into a higher-order operation. The operation input terminal (X) is connected to the shift-out terminal (Q) of the shift register 6 by the serial transmission line 16, while the operation input terminal (Y) is connected with the shift-out terminal (Q) of the shift register 3 by the serial transmission line 12. In other words, the first data A which are shifted out from the shift-out terminal (Q) of the shift register 6, are provided to the operational input terminal (X), while the second data B which are provided to the shift-in terminal (D) of the shift register 6 via the serial transmission line 12, are provided to the operation terminal (Y). The carry input terminal Ci is connected to the output terminal Q of the flop-flip circuit 22. The output terminal S is connected to the shift-in terminal (D) of the shift register 19. The carry output terminal Co is connected to the input terminal D of the flip-flop circuit 22.

The clock signal input terminal (CK) of the flip-flop circuit 22 and the same of the shift register 19 are connected to the trigger signal input terminal 11, to receive the clock signal CK for synchronous data transfer use. Reset terminals (R) of the flip-flop circuit 22 and the shift register 19 are connected to the input terminal 18, which provides the reset signal R.

The bit data stored in the shift register are provided in parallel to the system on a group of lines 23. The shift register 19 is arranged in such a manner that it may also shift out the data in series from its shift-out terminal (Q) on a line 24.

Next, the operation of the receiving device 2 will be described in the following.

The first transfer of the data A is carried out in the same way as in the above first embodiment. As the first round of the data transfer is over and the transfer of the data B is initiated, the adding circuit 20 is ready to immediately start the add operation with regard to the data A and B.

In the add operation, the bit A0 of the data A on the line 16 and the bit B0 of the data B on the serial data line 12 are respectively provided to the operation input terminals (X) and (Y) of the full adder 21, and are added together. The result of this add operation is then provided to the shift-in terminal (D) of the shift register 19 as it is. However, if a carry signal CY is generated during the add operation, the carry signal CY is saved in the flip-flop circuit 22 for use as a carry in signal in the add operation of the next higher-order bit. In like manner, the remaining corresponding bits of the data A and B are added together by means of the full adder 22, together with the carry in signal Ci from the lower-order bit.

In this way, corresponding bits of the data A and B are received by the full adder 21 at the operation input terminals (X) and (Y), and the add operation result is provided to the shift register 19 as it is. Consequently, the add operation may be completed at the same time that the transfer of the entire data B on a bit-by-bit basis is completed, and the add operation result is stored in the shift register 19. In this case, the add operation result may be provided to the system as parallel data on the group of lines 23, or as serial data on the line 24.

As described above, according to the receiving device 2 of the second embodiment, just as in the case of the first embodiment, transfer of the data and the add operation of the corresponding bits thereof may be carried out at the same time. Furthermore, in order to carry out the add operation, where the prior art device requires the save register having a capacity capable of storing the full size of data, such is no longer needed in the invention. Still further, it is no longer necessary for an operation circuit to be provided having a capacity corresponding to the bit length of the received data A and B, thus enabling the scale of the circuit to be reduced to a great extent.

The above explanation of the first and second embodiments has been made assuming that all the shift registers operate according to the LSB (least significant bit) first transfer system. However, because all the shift registers are identical to each other in respect of their data shifting direction, use of the most significant bit (MSB) first transfer system results in the same advantageous effect as is attainable by means of the LSB first transfer system.

Two preferred examples of the receiving device for synchronous serial transmission data embodying the invention have been described hereinabove with reference to the accompanying drawings, but it should be noted that the invention is not limited to these disclosed embodiments. It should be apparent to those skilled in the art that various changes or modifications may be made without departing from the technical thought as recited in the scope of claims for patent as attached hereto. Therefore, those changes and modifications should naturally fall within the scope of the technical thought of the invention.

For instance, the above first embodiment of the invention is explained by way of an example in which identity or non-identity of the data is determined by using a comparison operation. However, if the device is constituted with means operable according to the MSB or LSB data transfer system in place of the comparison circuit 15, the device may be readily changed to a device that carries out a comparison of the data magnitude.

Furthermore, with regard to both of the first and second embodiments, it is explained that the data A and B are transferred from the transmitting end and received by the receiving device 2, and then they are processed therein according to the comparison operation or others. However, the first transferred data A as the operand may be loaded in advance in the receiving shift register 6 of the device 2. Therefore, it is possible to execute the like comparison operation or others with regard to the data already existing in the receiving end and the data as transferred from the transmitting end.

Since the invention is constituted as has been described above, the operation circuit which performs the comparison operation or others on the transferred data, may be arranged on a small scale. Furthermore, since it is possible that the comparison operation or others of the data can be executed at the same time as they are transferred, an improved and efficiently operable receiving device is provided for synchronous serial transmission data.

What is claimed is:

1. A receiving device for synchronous serial transmission data, comprising:

a transmission path on which the data is transmitted, synchronized with a clock signal of a bit serial system;

a first shift register that receives said transmitted data in series from the transmission path, and holds the received data;

an operating device that executes a logical operation on a bit-by-bit basis on the received data serially provided by said first shift register and the transmitted data serially provided on the transmission path, and that generates serial operation result data; and a second shift register that receives the operation result data from the operating device, and holds the operation result data.

2. A receiving device as claimed in claim 1, further comprising a shift counter which generates a carry signal when the reception of said transmitted data by said first shift register is completed.

3. A receiving device as claimed in claim 1, wherein said second shift register produces said operation result data held therein as parallel data.

4. A receiving device as claimed in claim 1, wherein said second shift register produces said operation result data held therein as serial data.

5. A receiving device as claimed in claim 1, wherein said operating device is a device that compares said transmitted data with said received data to determine the identity or non-identity therebetween.

6. A receiving device as claimed in claim 1, wherein said operating device serially adds the transmitted data and the received data.

* * * * *